(12) United States Patent
Lin et al.

(10) Patent No.: US 8,353,310 B2
(45) Date of Patent: Jan. 15, 2013

(54) VALVES HAVING REMOVABLE INTERNAL ACTUATION MECHANISMS

(75) Inventors: Chun Lin, McKinney, TX (US); Tung Kim Nguyen, McKinney, TX (US); Roy Ronald Pelfrey, Sherman, TX (US)

(73) Assignee: Fisher Controls International, LLC, St. Louis, MO (US)

( * ) Notice: Subject to any disclaimer, the term of this patent is extended or adjusted under 35 U.S.C. 154(b) by 1074 days.

(21) Appl. No.: 12/247,839

(22) Filed: Oct. 8, 2008

(65) Prior Publication Data
US 2010/0084594 A1 Apr. 8, 2010

(51) Int. Cl.
*F16K 31/12* (2006.01)
(52) U.S. Cl. .... 137/490; 137/221; 137/460; 137/630.15
(58) Field of Classification Search ............... 137/630, 137/630.11, 630.15, 630.22, 460, 466, 462, 137/219, 221, 222, 599.16, 614.19, 489, 137/490, 614.16–614.18, 627.5
See application file for complete search history.

(56) References Cited

U.S. PATENT DOCUMENTS

| 263,731 | A | * | 9/1882 | Shaw | 239/570 |
|---|---|---|---|---|---|
| 845,063 | A | * | 2/1907 | Desper | 137/219 |
| 1,769,621 | A | | 7/1930 | Chace | |
| 2,833,299 | A | * | 5/1958 | Marriette | 137/221 |
| 2,904,074 | A | * | 9/1959 | Towler | 137/630.15 |
| 3,038,488 | A | * | 6/1962 | Welch et al. | 137/219 |
| 3,038,691 | A | * | 6/1962 | Awerkamp | 137/219 |
| 3,172,420 | A | * | 3/1965 | Brown et al. | 137/219 |
| 3,650,288 | A | * | 3/1972 | Bruton et al. | 137/219 |
| 3,844,312 | A | | 10/1974 | Sumner et al. | |
| 3,884,251 | A | | 5/1975 | Knight | |
| 4,615,354 | A | * | 10/1986 | Bianchi | 251/25 |
| 5,848,608 | A | * | 12/1998 | Ishigaki | 137/630 |

FOREIGN PATENT DOCUMENTS
DE 1257506 12/1967
GB 944384 12/1963

OTHER PUBLICATIONS

International Searching Authority, "International Search Report," issued in connection with international application No. PCT/US2009/054624, mailed Nov. 13, 2009, 5 pages.
International Searching Authority, "Written Opinion of the International Searching Authority," issued in connection with international application No. PCT/US2009/054624, mailed Nov. 13, 2009, 7 pages.

(Continued)

*Primary Examiner* — Craig Schneider
*Assistant Examiner* — Craig J Price
(74) *Attorney, Agent, or Firm* — Hanley, Flight & Zimmerman, LLC

(57) ABSTRACT

Internal valve apparatus are described. An example internal valve includes a body having a valve seat disposed between an inlet and an outlet. A flow control member operatively coupled to the body moves between a first position in which the flow control member engages the valve seat to restrict the flow of fluid through the valve and a second position in which the flow control member is spaced from the valve seat to allow the flow of fluid through the valve. The example internal valve further includes a removable actuation member disposed within the body and responsive to a fluid pressure to cause the flow control member to move between the first and second positions.

18 Claims, 6 Drawing Sheets

OTHER PUBLICATIONS

Emerson Process Management, "Instruction Manual for Type N562 & N862 Emergency Shutoff Valves," published Feb. 2002, 4 pages.
Emerson Process Management, "Instruction Manual for Type C403-24 & C404-24 Internal Valves," published May 2002, 8 pages.
Emerson Process Management, "Replacement Parts Sheet for Internal Valves," published Jan. 2005, 2 pages.

Rego LP-GAS & Anhydrous Ammonia Equipment Buyer'S Guide, "Rego-Internal Valves and Accessories," pp. 70-77, Engineered Controls International, Inc.
International Bureau, "International Preliminary Report on Patentability," issued in connection with international application serial No. PCT/US2009/054624, issued Apr. 12, 2011, 8 pages.

* cited by examiner

VALVES HAVING REMOVABLE INTERNAL ACTUATION MECHANISMS

FIELD OF THE DISCLOSURE

The present disclosure relates generally to valves and, more particularly, to valves having removable internal actuation mechanisms.

BACKGROUND

Self-closing stop valves, which are commonly referred to as internal valves, provide protection against discharge of hazardous materials, compressed liquids, and/or gases such as, for example, propane, butane, $NH_3$ (anhydrous ammonia), etc., when transferring the hazardous material between a first location and a second location. Internal valves employ flow control mechanisms that close in response to a sudden excess flow condition due to, for example, a broken, severed, or otherwise compromised flow path. Such flow control mechanisms are commonly referred to as excess flow valves, which are often used in applications requiring an automatic, safe cutoff of fluid flow in response to potential leaks, spills, etc. of potentially dangerous (e.g., combustible, toxic) fluids.

The excess flow valve typically operates based on a pressure differential across the valve. For example, the valve opens when the inlet pressure is approximately equal to the outlet pressure. To equalize the pressure across the valve, internal valves typically employ an equalization member that is actuated to equalize or balance the pressure across the flow control member. An internal valve often requires the use of an actuation mechanism or system such as for example, a lever, a cable control, and/or a powered actuator system. Typically, the actuation mechanism employed allows the equalization member to move between a fully closed position and a fully open position.

In one example, an actuator such as, for example, an external pneumatic actuator may be used to remotely operate the internal valve. Such external pneumatic actuators have a large overall footprint and require an increased amount of space. However, such known internal valves are often used in certain applications having small or tight space constraints, making it difficult to install such an external pneumatic actuator with the valve. Such external pneumatic actuators may also require an additional support member when the valve is installed.

Additionally or alternatively, many known actuation methods are exclusive of one another and, as a result, many manufacturers provide a number of differently designed internal valve product families, each of which is specifically configured to suit the particular needs of a different customer. Such an approach results in manufacturers having to produce and support a large number of diverse products, which is logistically difficult and costly.

SUMMARY

In one example, an example internal valve includes a body having a valve seat disposed between an inlet and an outlet. A flow control member operatively coupled to the body moves between a first position in which the flow control member engages the valve seat to restrict the flow of fluid through the valve and a second position in which the flow control member is spaced from the valve seat to allow the flow of fluid through the valve. An actuation member is disposed within the body and responsive to a fluid pressure to cause the flow control member to move between the first and second positions.

In another example, a fluid control apparatus includes a first flow control member movable between a first operating position and a second operating position and an actuation mechanism removably coupled to the valve to move the valve between the first operating position and the second operating position. The actuation mechanism is selected from a plurality of actuation mechanisms and is interchangeable with a second actuation mechanism selected from the plurality of mechanisms. The actuation mechanism is disposed within a body of the valve between an inlet and an outlet of the valve.

In yet another example, a valve includes means for operating the valve between a first operating position and a second operating position. The valve also includes means for equalizing a pressure differential across the valve to activate the means for operating the valve between the first operating position and the second operating position and means for positioning the means for equalizing the pressure. The means for positioning is disposed within a body of the valve and responsive to a fluid pressure to cause the means for equalizing the pressure to move between at least a third position and a fourth position.

DETAILED DESCRIPTION

Figure 1:
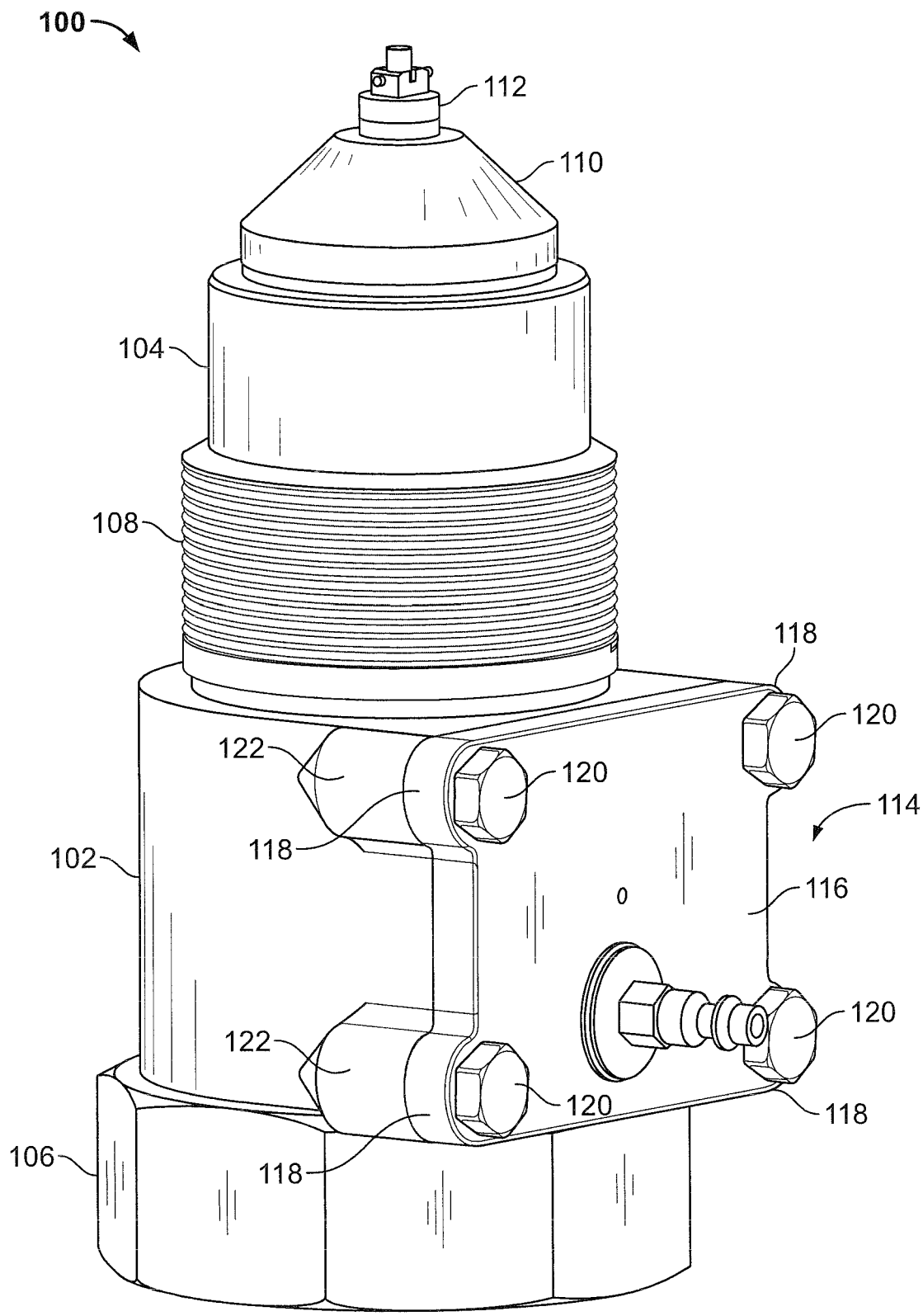
FIG. 1 illustrates an example valve described herein implemented with an example internal actuator.

Typically, an excess flow valve of an internal valve opens or closes based on a pressure and/or fluid flow rate of a system in which the internal valve is coupled or installed. As a result, when operating a system employing an internal valve having an integral excess flow valve, it is typically necessary to equalize the pressure between the valve inlet and outlet before fluid is pumped through the valve. Internal valves often employ an equalization member that is actuated via an actuation mechanism to equalize or balance the pressure across the primary flow control member of the internal valve. Such actuation mechanisms may include, for example, a lever, a cable control, a powered actuator system, etc. Typically, the actuation mechanism moves the equalization member between at least a first position (e.g., a fully closed position) and a second position (e.g., a fully open position in which fluid is allowed to flow through a bleed passageway).

External pneumatic actuators are often used to control the operation of the equalization member. Typically, such an external pneumatic actuator is operatively coupled to a lever of the internal valve which, in turn, is operatively coupled to the equalization member via a cam member. Such a lever and cam assembly requires a packing system to prevent unwanted leakage through the lever mechanism. Additionally, internal valves are often used in certain applications having space constraints that make it difficult to access the internal valve, its lever assembly, etc. However, such external pneumatic actuators have a large overall footprint requiring an increased amount of space, which may limit the applications of pneumatically operated internal valves. The external pneumatic actuators may also require an additional support member when the valve is installed. However, external pneumatic actuators can be easily removed from the valve while the valve is in-line with a system for maintenance, repair, and/or replacement of the pneumatic actuator.

The example valves described herein include removable internal actuation mechanisms that provide a more compact internal valve. One example internal actuation mechanism includes an internal pneumatic actuator. More specifically, the internal actuator (e.g. a pneumatic actuator) may be suspended or cantilevered inside a fluid passageway of a valve between an inlet and an outlet when the actuator is attached to a valve body. The example internal pneumatic actuator can be easily replaced and/or field serviced by a technician, service personnel, maintenance personnel, etc., because the actuator is removably coupled to the valve. In one example, the actuator is removably coupled to a body of the valve via threaded fasteners. In other examples, the actuator may be coupled to a body of the valve via clamps and/or any other suitable fastening mechanism(s).

Such a configuration enables maintenance, repair, and/or replacement of the internal pneumatic actuator while the valve remains in-line with the system. Also, the example internal pneumatic actuator does not require a valve packing because the internal pneumatic actuator is disposed within the valve, thereby reducing the number of parts and eliminating a potential unwanted leakage through the packing. Additionally or alternatively, the example valves described herein may be optionally converted between a manually (e.g., a lever) operated valve and a power (e.g., pneumatic actuator) operated valve without having to remove the valve from the system (i.e., while the valve is in-line with the system).

Furthermore, the example internal valves described herein can receive (e.g., interchangeable fitted or configured with) different actuation mechanisms that are not exclusive of one another. As a result, many manufacturers can provide a number of differently configured internal valve products having a modular body configured to receive a plurality of different actuation mechanisms to suit the needs of various customer applications. Such an approach enables manufacturers to produce and support a smaller number of diverse products, thereby reducing overall manufacturing costs, stocking costs, etc.

An example internal valve described herein includes an internal pneumatic actuator removably coupled to a body of the valve. The internal pneumatic actuator is disposed within (e.g. cantilevered or suspended within) a passageway of the body of the internal valve between an inlet and an outlet of the valve and is responsive to a fluid pressure to cause a flow control member to move between a first position in which the flow control member restricts the flow of fluid through the valve and a second position in which the flow control member allows the flow of fluid through the valve. Furthermore, the example actuation mechanism may be selected from a plurality of actuation mechanisms and may be interchangeable with a second different actuation mechanism selected from the plurality of mechanisms. As noted above, the actuation mechanisms may include a lever, cable controls, a pneumatic actuator, and/or any other suitable actuation mechanism(s).

FIG. 1 illustrates an example valve 100 described herein. The example valve 100 is depicted as a self-closing stop valve such as, for example, an internal valve. A body 102 of the valve 100 has a first or upper portion 104 configured to be in fluid communication with a first or upstream pressure source (e.g., a pipeline, a bobtail truck, a tank, etc.) at which relatively high pressure process fluid is presented and a second or lower portion 106 configured to be in fluid communication with a second or downstream pressure source (e.g., a pump, a pipeline, a hose, a bobtail truck, etc.) to which the example valve 100 provides fluid. For example, the first pressure source may include a tank containing a pressurized gas or liquid to be delivered to a destination via, for example, the valve 100. In other words, the first portion 104 of the valve 100 may be immersed in or surrounded by relatively high pressure fluid. The second portion 106 of the valve 100 may be disposed outside of the first pressure source to receive a hose, a pipe, or any other suitable fluid transport component. Thus, fluid flows from the first pressure source to a transport component (e.g., a hose) via the valve 100 to a destination (e.g., another storage tank and/or additional process control elements).

The body 102 has an externally threaded portion 108 between the first portion 104 and the second portion 106. The threaded portion 106 may be threadably engaged with a corresponding threaded aperture of the first pressure source such as, for example, a tank or other suitable storage vessel, thereby disposing the first portion 104 of the valve 100 inside the first pressure source. In other examples, the valve 100 may include a body having a flanged portion or a double flanged portion for coupling or mounting the example valve 100 to a piping system, a storage tank, a bobtail truck system, or any other suitable fluid distribution system. Furthermore, although the example valve 100 is depicted as an internal valve, the examples described herein may be implemented with any other suitable flow control apparatus and/or valve(s).

The example valve 100 includes a primary or first flow control member or main poppet 110 that operates between a first operating position and a second operating position in which the valve 100 is closed and opened, respectively. The main poppet 110 operates between the first and second operating positions in response to a pressure differential across the example valve 100 as described further below. To control or affect a pressure differential across the example valve 100, the example valve 100 includes a second flow control member or equalization member 112. The equalization member 112 operates between at least a first operating position in which the equalization member 112 is closed and a second operating position in which the equalization member is opened. In the illustrated example, the equalization member 112 also includes a third operating position or bleed position between the first and second operating positions.

The operating positions of the valve 100 may be selected by an actuation mechanism 114 described in greater detail below. The actuation mechanism 114 is removably coupled to the body 102 so that the actuation mechanism 114 may be removed from the body 102 (e.g., in the field) without having to remove the valve 100 from a system (i.e., while the internal valve 100 is in-line with the system). For example, the actuation member 114 may be removed from the body 102 via an opening (e.g. an access port) substantially perpendicular to a longitudinal axis of the body 102 between the inlet 206 and the outlet 208. Thus, the example actuation member 114 may be removed from the body 102 while the body 102 remains in-line with a process system. For example, the actuation mechanism 114 may be removed for maintenance services, to repair or replace the actuation mechanism 114, and/or interchange the actuation mechanism 114 with a second (e.g., different) actuation mechanism selected from a plurality of interchangeable actuation mechanism(s). The actuation mechanism 114 may be implemented as a cable control, a linkage mechanism, an actuator (e.g., a pneumatic actuator), or any other suitable actuation mechanism(s). Additionally, in contrast to known internal valves, the actuation mechanism 114 is disposed within (e.g., inside) the body 102 of the valve 100, thereby providing a more compact valve 100 having a smaller footprint that may be used with systems requiring a more compact valve as compared to known internal valves having external actuation mechanisms. More specifically, the actuation mechanism 114 is suspended or cantilevered in a passageway of the body 102 between the inlet 206 and the outlet 208.

As shown in FIG. 1, the actuation mechanism 114 includes a housing 116 having flanged edges 118. The flanged edges 118 include mounting apertures (e.g., threaded apertures) to receive fasteners 120 that engage respective bores 122 of the body 102 for removably coupling the actuation mechanism 114 to the body 102. The housing 116 may be mounted to the body 102 via the fasteners 120 or any other suitable fastening mechanism(s).

Figure 2:
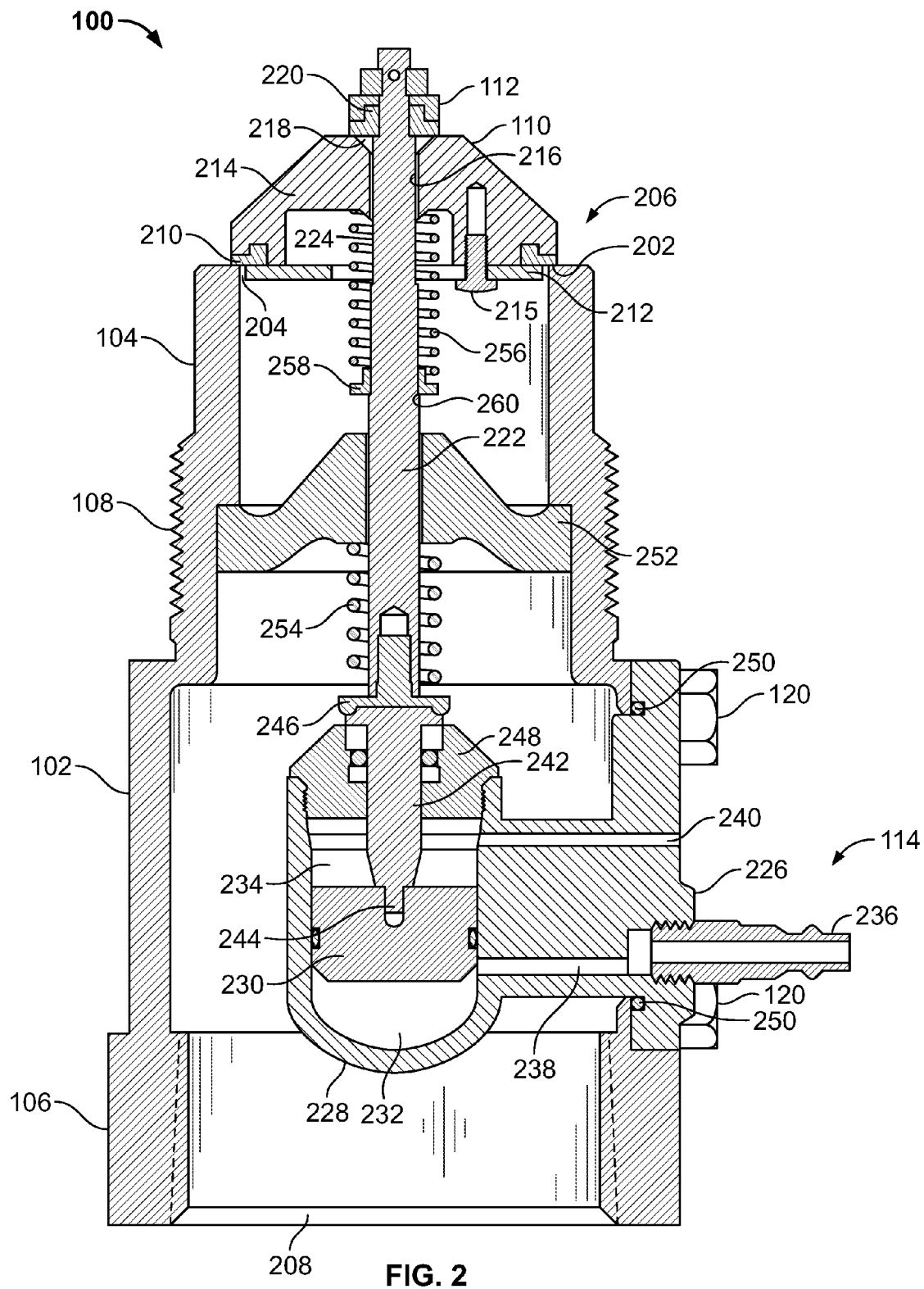
FIG. 2 is a cross-sectional view of the example valve of FIG. 1.

FIG. 2 illustrates a cross-sectional view of the example valve 100 of FIG. 1. The main poppet 110 is operatively coupled to the body 102 and moves between a first operating position and a second operating position to control the flow of fluid through the body 102 of the valve 100. The body 102 is the main pressure boundary of the valve 100 and supports or defines a seating surface or valve seat 202, which defines an orifice 204 that provides a fluid flow passageway to establish communication between an inlet 206 and an outlet 208 when the main poppet 110 is spaced from the seating surface 202.

In the illustrated example, the main poppet 110 is depicted as a disc-type valve assembly that includes a disc 210 (e.g., a metal disc, a rubber disc, etc.) that engages the seating surface 202 to restrict the flow of fluid through the valve 100. A disc retainer 212 couples the disc 210 to a disc holder 214 via, for example, a fastener 215. The disc holder 214 includes an aperture defining a bleed flow path 216 and a bleed port or orifice 218. As shown in the example, the bleed port 218 is integrally formed with the main poppet 110 and provides a fluid flow passageway between the inlet 206 and the outlet 208.

The equalization member 112 is operatively coupled to the main poppet 110 and moves between at least a first position to engage the bleed port 218 to prevent or restrict the flow of fluid through the bleed flow path 216 and a second position spaced from the bleed port 218 to allow the flow of fluid through the bleed port 218. In the illustrated example, the equalization member 112 can also move to a third position or rapid bleed position between the first and second operating positions. The equalization member 112 includes a disc member 220 that engages the bleed port 218 to prevent or restrict the flow of fluid through the bleed flow path 216.

The equalization member 112 is operatively coupled to the actuation mechanism 114 via a valve stem 222. In the illustrated example, the valve stem 222 may include a reduced diameter or a recessed portion 224 to form a larger gap between the valve stem 222 and the bleed flow pathway 216 when the equalization member 112 is at the third position. In this manner, the equalization member 112 enables a greater or increased fluid flow rate through the bleed pathway 216 to enable quicker pressure equalization across the example valve 100 between the inlet 206 and the outlet 208.

In the illustrated example, the actuation mechanism 114 is an internal pneumatic actuator 226. The internal pneumatic actuator 226 is disposed within, cantilevered or suspended relative to the body 102 between the inlet 206 and the outlet 208 and is responsive to a fluid pressure to cause the equalization member 112 to move between the at least first and second positions. Because the pneumatic actuator 226 is disposed or suspended within the body 102, the example valve 100 provides a more compact overall foot print, which is particularly advantageous for use with fluid systems requiring a more compact or smaller foot print due to system configurations having size constraints.

The pneumatic actuator 226 includes a housing 228 having a piston 230 disposed between a first fluid chamber 232 in fluid communication with an external pressure source and a second fluid chamber 234 in fluid communication with an atmospheric pressure. The housing 228 includes a nozzle 236 to receive, for example, a hose coupled to the external fluid pressure source. A first pathway 238 of the housing 228 fluidly couples the first fluid chamber 232 to the external fluid pressure source through which pressurized fluid is provided to move the piston 230 to a first or upper position, and through which the pressurized fluid is removed from the first fluid chamber 232 to move the piston 230 to a second or lower position. A second pathway 240 provides a vent to expel fluid (e.g., air) from the second fluid chamber 234 to the atmosphere when the piston 230 moves to the upper position.

An actuator stem 242 is coupled to the piston 230 at a first end 244 of the actuator stem 242 and operatively coupled to the valve stem 222 via a coupling member 246. A cap 248 threadably coupled to the housing 228 supports the actuator stem 242. Additionally, the pneumatic actuator 226 may include a sealing member 250 (e.g., an O-ring) disposed between the housing 228 and the body 102 to provide a tight seal to prevent unwanted leakage between the body 102 and the housing 228.

Additionally or alternatively, the example pneumatic actuator 226 does not require a valve packing, thereby reducing the number of components and eliminating potential unwanted leakage through a valve packing. Furthermore, the example internal pneumatic actuator 226 may be removed from the body 102 while the valve 100 remains in-line with a system when replacing and/or repairing the pneumatic actuator 226. Such a configuration enables the valve 100 to be field serviced. Additionally or alternatively, the pneumatic actuator 226 may be replaced with a manual actuation mechanism to convert the valve 100 to a manually operated valve 100 as described below in connection with FIGS. 5 and 6.

The example valve 100 may also include a guide 252 to support the valve stem 222. A first biasing element or closing spring 254 is disposed between the guide 252 and the coupling member 246 to bias the equalization member 112 toward the bleed port 218 (i.e., in a closed position) to restrict flow of fluid through the bleed port 218 when the piston 230 is in the lower position. Furthermore, the example valve 100 may include a second biasing element or excess flow spring 256 disposed between the main poppet 110 and a spring seat 258 to bias the main poppet 110 toward the seating surface 202 to restrict the fluid flow through the orifice 204 when the flow rate through the valve 100 exceeds a specified or predetermined flow rate (e.g., an excess flow limit or rate). The spring seat 258 is supported by a step portion or shoulder 260 of the valve stem 222 formed by the reduced diameter portion 224 of the valve stem 222.

Figure 3:
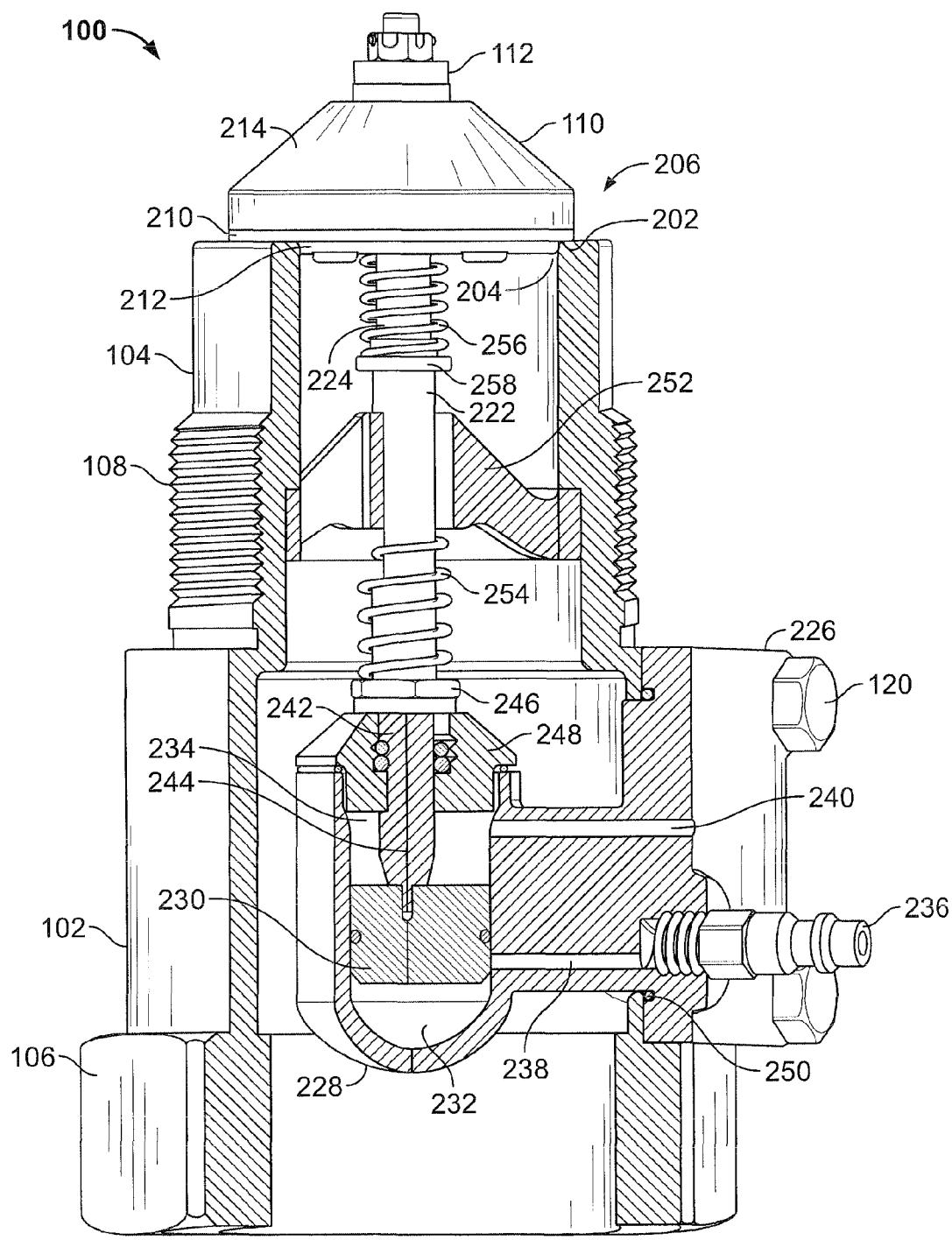
FIG. 3 illustrates a partial cutaway view of a portion of the example valve of FIGS. 1 and 2.
Figure 4:
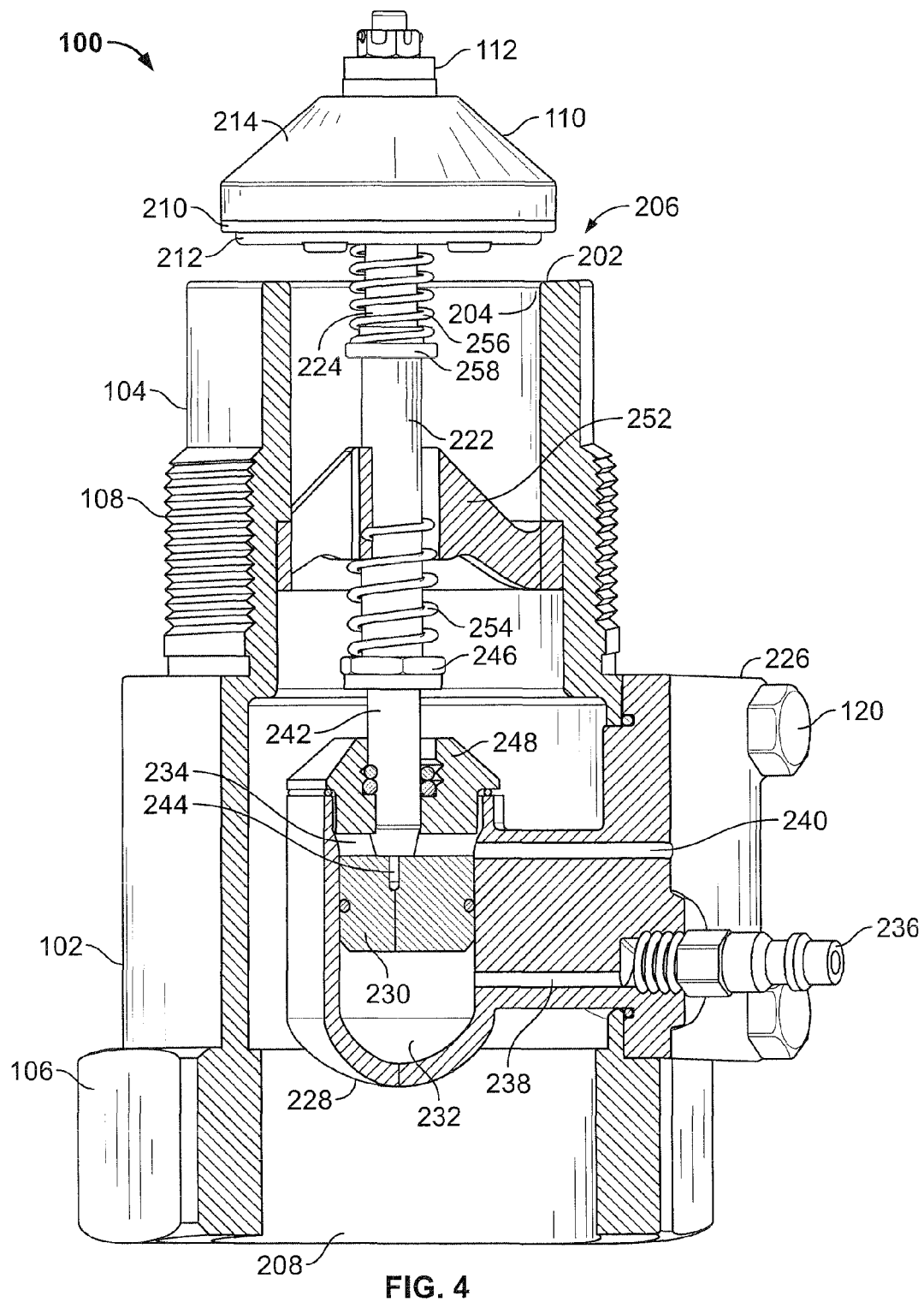
FIG. 4 illustrates another partial cutaway view of a portion of the example valve of FIGS. 1, 2 and 3.

FIG. 3 illustrates the example valve 100 at the first operational position (e.g., the closed operating position) and FIG. 4 illustrates the example valve 100 at the second operational position (e.g., the open operating position). In operation, the main poppet 110 and the equalization member 112 are biased toward the closed position by the biasing element 254 and the pressure of the first pressure fluid source at the inlet 206 of the valve 100. The main poppet 110 engages the seating surface 202 to prevent the flow of fluid through the orifice 204 and the equalization member 112 engages the bleed orifice 218 to prevent the flow of fluid through the bleed pathway 216. The equalization member 112 and the main poppet 110 provide an excess flow functionality that maintains system safety. More specifically, the excess flow function protects the system by automatically restricting fluid flow from the inlet 206 when a flow rate becomes too high. In other words, the biasing element 256 has an excess flow spring rating that causes the main poppet 110 to move toward the seating surface 202 when the flow rate through the valve 100 exceeds a specific or predetermined flow rate.

The main poppet 110 operates based on a pressure differential between the inlet pressure and the outlet pressure of the example valve 100. When the inlet pressure is substantially greater than the outlet pressure, the main poppet 110 remains biased toward the seating surface 202 in a closed position (FIG. 3). On the other hand, when the inlet pressure is approximately equal to the outlet pressure, the main poppet 110 opens to allow fluid to flow through the example valve 100 at a relatively high rate (FIG. 4). The equalization member 112 is used to equalize or balance the pressure between the inlet 206 and outlet 208. For example, the equalization member 112 may place the valve 100 in a bleed state that allows a certain amount of fluid flow to equalize the pressure across the valve 100 which, in turn, enables the main poppet 110 to open (FIG. 3) to provide flow through the valve 100. When the pressure across the valve 100 is equalized, the biasing member 256 causes the main poppet 110 to move to the open operational position.

Referring to FIG. 4, to equalize the pressure across the valve 100 and, thus, to open the valve 100 to allow fluid flow, the pneumatic actuator 226 is activated to cause the equalization member 112 to move to the second position. In particular, fluid (e.g., air) from an external fluid pressure source is provided to the first chamber 232 through the first pathway 238 to cause the piston 230 to move to the upper position. As the piston 230 moves to the upper position, the fluid (e.g., air) within the second chamber 234 is expelled to the atmosphere through the second pathway 240. Also, the piston 230 causes the valve stem 222 to move toward the upper portion 104 so that the equalization member 112 is spaced from the bleed orifice 218 to allow the flow of fluid through the bleed pathway 216. In the illustrated example, the piston 230 may displace the equalization member 112 to the third position so that the rapid equalization portion 224 of the valve stem 222 is disposed within the bleed pathway 216 to enable rapid equalization through the bleed pathway 216.

When the pressure across the valve 100 equalizes, the main poppet 110 moves away from the seating surface 202 via the biasing element 256 to allow the flow of fluid through the valve 100 between the inlet 206 and the outlet 208. In the illustrated example, the pneumatic actuator 226 causes the equalization member 112 to move to the second position when the main poppet 110 is at the open operating position. In the open operating position, the equalization member 112 engages the main poppet 110 as shown in FIG. 4.

Removal of the fluid from the first chamber 232 via the first pathway 238 causes the piston 230 to move to the lower position. At the lower position, the piston 230 and the biasing element 254 (e.g., the closing spring) cause the main poppet 110 and the equalization member 112 to move to the closed position as shown in FIG. 3.

Figure 5:
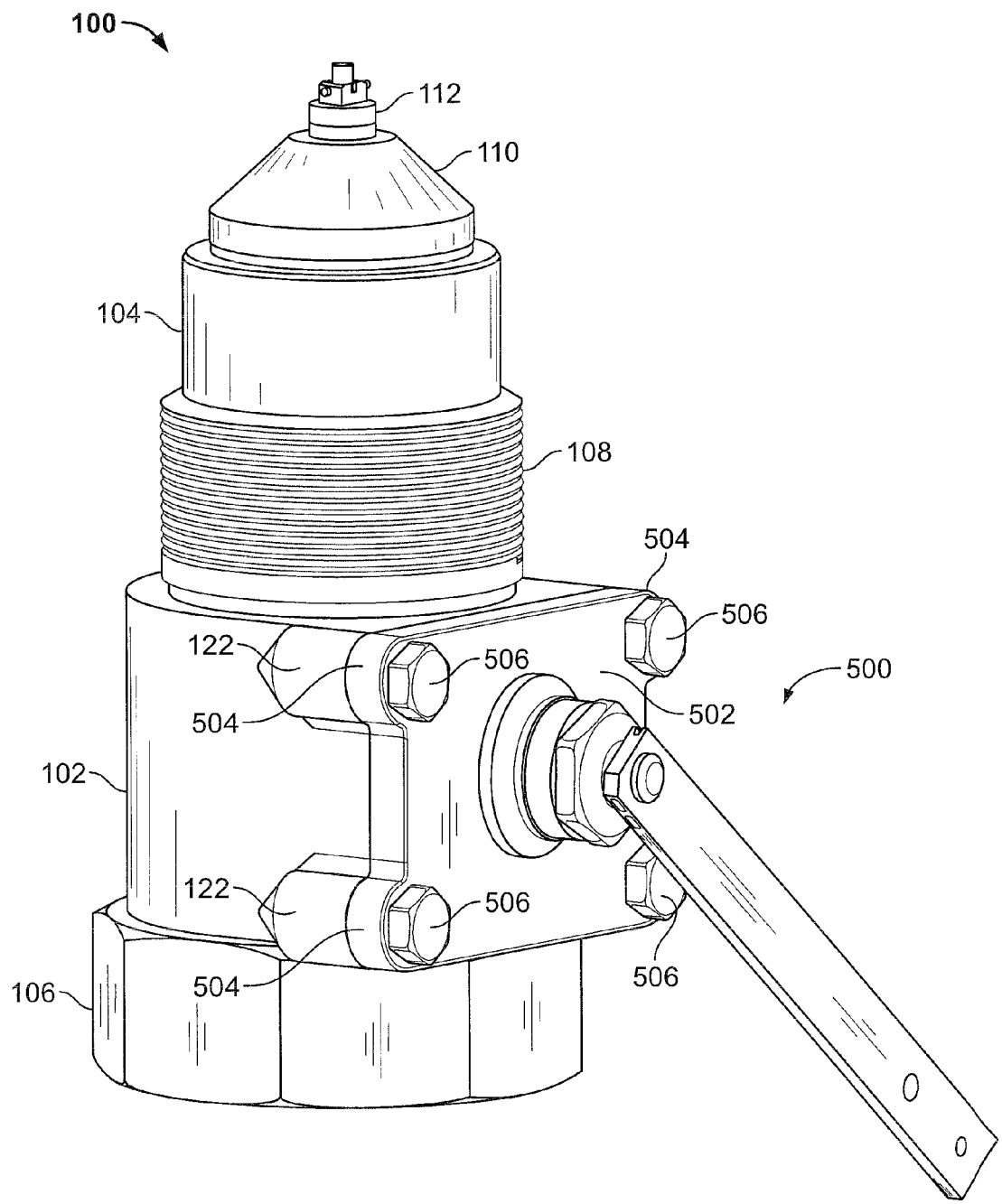
FIG. 5 illustrates the example valve of FIGS. 1-4, but implemented with an example lever.

Additionally or alternatively, the example valve 100 may be easily converted from a powered internal valve (e.g., the internal pneumatic actuator 226) to a manually operated valve (e.g., a lever). FIG. 5 illustrates the example valve 100 of FIGS. 1-4, but implemented or interchanged with a second actuation mechanism 500 different from the actuation mechanism 114 of FIGS. 1-4. As shown in FIG. 5, the actuation mechanism 500 includes a housing 502 having flanged edges 504. The flanged edges 504 include mounting apertures (e.g., threaded apertures) to receive fasteners 506 that engage the respective bores 122 of the body 102 to removably couple the actuation mechanism 500 to the body 102. The housing 502 may be mounted to the body 102 via the fasteners 506 or any other suitable fastening mechanism(s).

Figure 6:
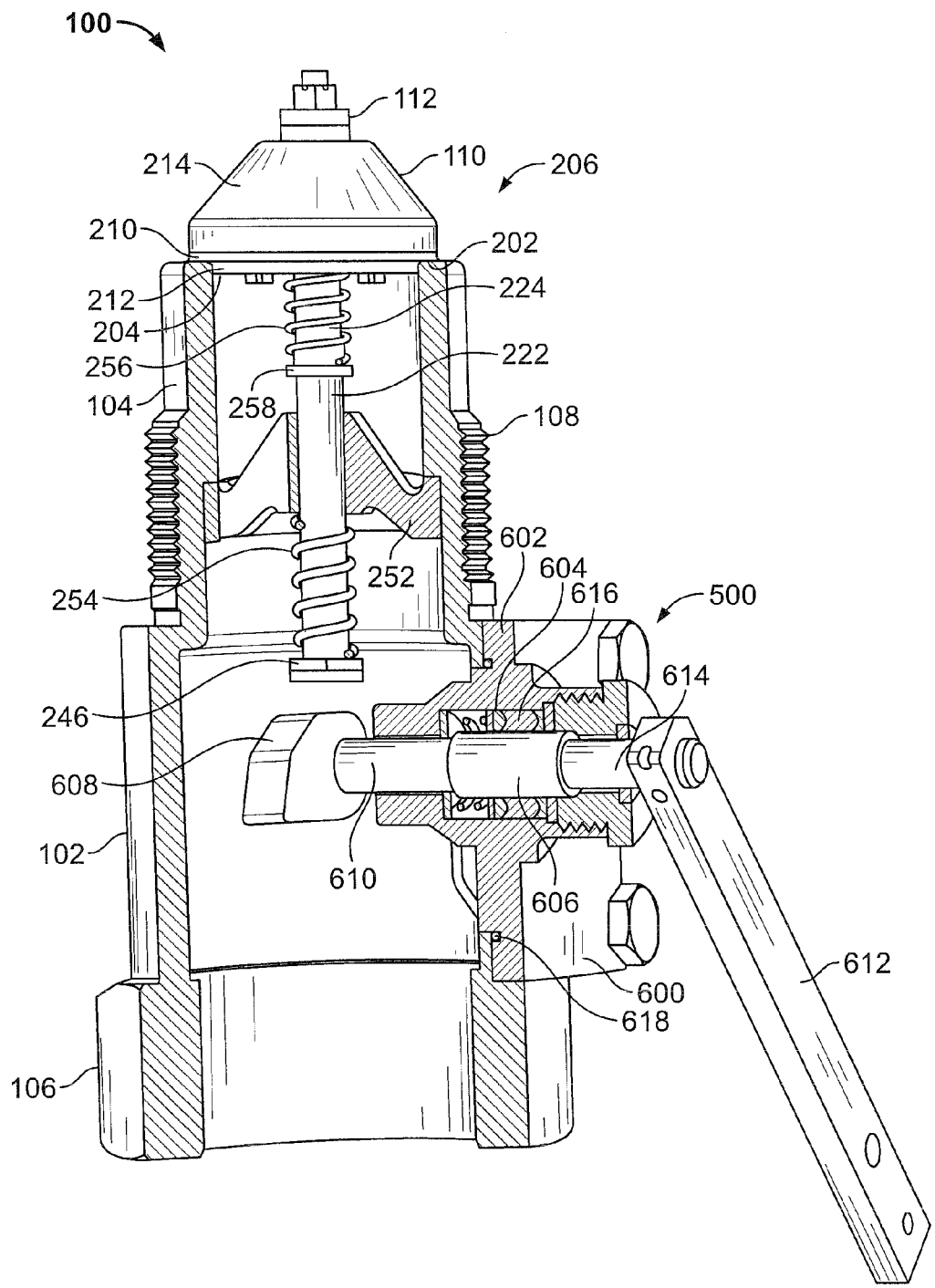
FIG. 6 illustrates a partial cutaway view of a portion of the example valve of FIG. 5.

FIG. 6 illustrates a partial cutaway view of a portion of the example valve 100 of FIG. 5 and the actuation mechanism 500. The example actuation mechanism 500 is a lever operated device 600. However, in other examples, the actuation mechanism 500 may be an internal pneumatic actuator, a cable controlled actuator, a linkage mechanism, or any other suitable actuation mechanism(s).

The lever 600 includes a housing 602 having a bore 604 to receive a shaft 606 operatively coupled to a cam 608 at a first end 610 of the shaft 606 and a handle 612 at a second end 614 of the shaft 606. The handle 612 is coupled to the shaft 606 via a pin, a fastener, or any other suitable fastening mechanism (s). The bore 604 may be sized to receive a packing 616 to prevent unwanted leakage through the bore 604 of the housing 602 along the shaft 606. Additionally or alternatively, a sealing member 618 (e.g., an O-ring) may be disposed between the body 102 and the housing 602 to provide a tight seal and prevent unwanted leakage between the body 102 and the housing 602.

In operation, when the valve 100 is in the closed operational position, the lever 600 is in a first position such that the cam 608 is spaced from the coupling member 246 and the valve stem 222. In this position, the biasing element 254 biases the equalization member 112 and the main poppet 110 toward the respective bleed port 218 and seating surface 202 to prevent the flow fluid through the valve 100. Rotation of the handle 612 between the first position and a second position causes the cam 608 to rotate and engage the coupling portion 246 to displace the valve stem 222 in a first direction toward the first portion 104 of the body 102. The displacement of the valve stem 222 toward the first portion 104 causes the equalization member 112 to move away from the bleed port 218 to allow fluid flow through the bleed pathway 216 from the inlet 206 to the outlet 208. In some examples, the lever 600 may be positioned to a third or intermediate position between the first position (e.g., the closed position) and the second position (e.g., the open position) of the equalization member 112. In the third position, the lever 600 positions the rapid bleed portion 224 of the valve stem 222 within the bleed pathway 216 to allow an increased bleed flow rate through the bleed port 218 to enable quicker pressure equalization across the example valve 100 between the inlet 206 and the outlet 208.

As the fluid flows from the inlet 206 to the outlet 208 through the bleed port 218, the pressure differential across the valve 100 (e.g., the main poppet) substantially equalizes. Equalization of the pressure across the main poppet 110 causes the main poppet 110 to move away from the seating surface 202 to the open operational position via the biasing element 256.

To close the example valve 100, the lever 600 is returned to the first position via the handle 612 so that the cam 608 disengages from the valve stem 222, thereby causing the biasing element 254 to bias the main poppet 110 and the equalization member 112 toward the respective seating surface 202 and the bleed port 118 to prevent or restrict the fluid flow through the valve 100.

Although certain example apparatus and articles of manufacture have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. An internal valve comprising:
a body having a valve seat disposed in a fluid flow passageway between an inlet and an outlet, the fluid flow passageway to receive a process fluid;
a flow control member operatively coupled to the body, the flow control member to move between a first position to engage the valve seat to restrict fluid flow through the valve and a second position to move away from the valve seat to allow fluid flow through the valve;
a removable actuator disposed inside the fluid flow passageway of the body between the inlet and the outlet and operatively coupled to the flow control member, the removable actuator being responsive to a fluid pressure independent of a pressure of the process fluid, the removable actuator to cause the flow control member to move between the first and second positions;
an equalization member to engage a bleed port integrally formed with the flow control member, the equalization member to move between at least a first operating position to engage the bleed port to restrict fluid flow through the bleed port and a second operating position to move away from the bleed port to allow fluid flow through the bleed port; and
a valve stem operatively coupled to the equalization member, the actuator to engage the valve stem to position the equalization member to the at least second operating position.

2. An internal valve as described in claim 1, wherein the actuator is removably coupled to the body via threaded fasteners.

3. An internal valve as described in claim 1, wherein the actuator is selected from a first plurality of actuators that is interchangeable with a second actuator selected from a second plurality of actuators.

4. An internal valve as described in claim 1, wherein the equalization member is movable to a third operating position to allow an increased fluid flow through the bleed port.

5. An internal valve as described in claim 1, wherein the first position of the flow control member comprises an open operational position of the valve and the second position comprises a closed operational position of the valve.

6. An internal valve as described in claim 1, further comprising an external pressure source to provide a control fluid to the actuator, the control fluid being isolated from the process fluid.

7. An internal valve as described in claim 4, wherein the actuator comprises an internal pneumatic actuator comprising:
a housing having a piston disposed between a first chamber in fluid communication with the external pressure source and a second chamber in fluid communication with an atmospheric pressure, an increased pressure in the first chamber is to cause the piston to move to a first piston position and a decreased pressure in the first chamber is to cause the piston to move to a second piston position; and
an actuator stem coupled to the piston at a first end of the actuator stem and operatively coupled to the valve stem at a second end of the actuator stem so that at the first piston position the piston is to cause the equalization member to move to the at least first operating position.

8. An internal valve as described in claim 7, further comprising a biasing element to cause the equalization member to move to the at least third operating position when the piston is at the second piston position.

9. A valve as described in claim 7, wherein the housing is disposed inside the fluid flow passageway between the inlet and the outlet such that fluid flow between the inlet and the outlet flows across the housing.

10. An internal valve comprising:
a body having a valve seat disposed in a fluid flow passageway between an inlet and an outlet, the fluid flow passageway to receive a process fluid;
a flow control member operatively coupled to the body, the flow control member to move between a first position to engage the valve seat to restrict fluid flow through the valve and a second position to move away from the valve seat to allow fluid flow through the valve;
an equalization member to engage a bleed port integrally formed with the flow control member, the equalization member to move between at least a first operating position to engage the bleed port to restrict fluid flow through the bleed port, a second operating position to move away from the bleed port to allow fluid flow through the bleed port, and a third operating position to allow an increased fluid flow through the bleed port; and
a removable actuator disposed inside the fluid flow passageway of the body between the inlet and the outlet and operatively coupled to the flow control member, the removable actuator being responsive to a fluid pressure independent of a pressure of the process fluid, the removable actuator to cause the flow control member to move between the first and second positions, the actuator having an internal pneumatic actuator that includes:
a housing having a piston disposed between a first chamber in fluid communication with the external pressure source and a second chamber in fluid communication with an atmospheric pressure, an increased pressure in the first chamber is to cause the piston to move to a first piston position and a decreased pressure in the first chamber is to cause the piston to move to a second piston position; and
an actuator stem coupled to the piston at a first end of the actuator stem and operatively coupled to the valve stem at a second end of the actuator stem so that at the first piston position the piston is to cause the equalization member to move to the at least first operating position and the actuator is to cause the equalization member to move to the third operating position.

11. A valve, comprising:
means for operating the valve between a first operating position and a second operating position;
means for equalizing a pressure differential across the valve to activate the means for operating the valve between the first operating position and the second operating position; and
means for actuating the means for equalizing the pressure, the means for actuating having a housing at a first end of the means for actuating, the housing having means for attaching the means for actuating to a valve body, a second end of the means for actuating to be suspended inside a fluid passageway of the valve between an inlet and an outlet when the means for actuating is attached to the valve body, the means for actuating to cause the means for equalizing the pressure to move between at least a third position and a fourth position.

12. A valve as described in claim 11, wherein the first operating position of the valve comprises an open position and the second operating position comprises a closed position.

13. A valve as described in claim 11, wherein the means for operating the valve between the first and second operating positions comprises a first means for controlling fluid flow, the first means for controlling fluid flow to engage first means for seating coupled to the body between the inlet and the outlet of the valve to restrict fluid flow through the valve and to move away from the first means for seating to allow the flow of fluid through the valve.

14. A valve as described in claim 13, wherein the means for equalizing the pressure across the valve comprises second means for controlling fluid flow, the second means for controlling fluid flow to engage second means for seating integrally formed with the first means for controlling fluid flow to restrict fluid flow between the inlet and the outlet and to move away from the second means for seating to allow fluid flow through the second means for seating.

15. A valve as described in claim 14, wherein the means for actuating the means for equalizing the pressure comprises means for pneumatically actuating the means for equalizing, the means for pneumatically actuating to engage a stem operatively coupled to the second means for controlling fluid flow to move the second means for controlling fluid flow away from the second means for seating to allow fluid flow through the second means for seating to equalize the pressure across the valve.

16. A valve as described in claim 11, wherein the means for actuating comprises an internal pneumatic actuator.

17. A valve as described in claim 11, wherein the means for actuating comprises a cam mechanism.

18. A valve as described in claim 17, wherein the cam mechanism comprises a handle operatively coupled to a cam to engage the valve stem to position the flow control member between the first position and second position.

* * * * *